(12) United States Patent
Kim et al.

(10) Patent No.: US 11,565,753 B2
(45) Date of Patent: Jan. 31, 2023

(54) HIGH-STRENGTH METAL PLATE FOR VEHICLES

(71) Applicants: Hyundai Motor Company, Seoul (KR); Kia Motors Corporation, Seoul (KR)

(72) Inventors: Min Jae Kim, Gyeongsangbuk-do (KR); Jong Seung Won, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 315 days.

(21) Appl. No.: 17/022,659

(22) Filed: Sep. 16, 2020

(65) Prior Publication Data

US 2021/0237799 A1 Aug. 5, 2021

(30) Foreign Application Priority Data

Feb. 3, 2020 (KR) .................. 10-2020-0012496

(51) Int. Cl.
*B21D 31/00* (2006.01)
*B21D 47/00* (2006.01)
*B62D 21/02* (2006.01)
*F01N 1/00* (2006.01)

(52) U.S. Cl.
CPC ............ *B62D 21/02* (2013.01); *B21D 31/00* (2013.01); *B21D 47/00* (2013.01); *F01N 1/00* (2013.01)

(58) Field of Classification Search
None
See application file for complete search history.

(56) References Cited

U.S. PATENT DOCUMENTS

2012/0034431 A1* 2/2012 Caprioli ................ F16L 59/026
428/195.1
2013/0095343 A1* 4/2013 Arsene ............... B62D 25/2054
492/30
2017/0355324 A1* 12/2017 Kumar .................... F16L 59/02

FOREIGN PATENT DOCUMENTS

| JP | 4402745 B2 | 1/2010 |
| KR | 2012-0000636 A | 1/2012 |
| KR | 101420401 B1 | 7/2014 |

* cited by examiner

*Primary Examiner* — Elizabeth Collister
(74) *Attorney, Agent, or Firm* — Fox Rothschild LLP

(57) ABSTRACT

A high-strength metal plate for vehicles is provided. The plate includes oval embossments that protrude from the plate. The embossments include first embossments that have a longer axis oriented in a first direction and second embossments that have a longer axis in a second direction. Bridges are provided on portions of the flat plate between the embossments and flat portions are provided on the flat plate to be surrounded by the first and second embossments while the bridges separate the flat portions from each other.

13 Claims, 4 Drawing Sheets

[ A-A cross-section ]

[ B-B cross-section ]

[ C-C cross-section ]

[ D-D cross-section ]

[ E-E cross-section ]

[ F-F cross-section ]

HIGH-STRENGTH METAL PLATE FOR VEHICLES

CROSS REFERENCE TO RELATED APPLICATION

The present application claims priority to Korean Patent Application No. 10-2020-0012496, filed Feb. 3, 2020, the entire contents of which is incorporated herein for all purposes by this reference.

BACKGROUND

Field of the Disclosure

The present disclosure relates generally to a high-strength metal plate for vehicles and, more particularly, to a high-strength metal plate for vehicles having a structure, by which the strength of the plate is improved and the thickness of the plate is reduced to thus reduce the weight of the plate and improve the fuel efficiency of a vehicle in which the plate is used.

Description of the Related Art

In vehicles, metal plates are generally used in components, such as a muffler housing of an exhaust system and a heat protector, as well as chassis panels. Typically, vehicle plates generally used have a circular embossment pattern. In a plate having a circular embossment pattern of the related art, as illustrated in FIG. 10, flat portions without an embossment are continuously connected, thereby reducing the resonance frequency and strength thereof.

In addition, when the thickness of a vehicle plate is reduced for a lightweight structure, the strength of the plate may be reduced, thereby reducing the durability and vibration performance of the plate. Therefore, it is difficult to reduce the weight and improve the fuel efficiency of a vehicle using vehicle plates currently used in the related art.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a high-strength metal plate for vehicles having a structure, by which the strength of the plate may be improved and the thickness of the plate may be reduced to thus reduce the weight of the plate and improve the fuel efficiency of a vehicle in which the plate is used.

According to one aspect of the present disclosure, a high-strength metal plate for vehicles is provided. The plate may be a flat plate, and may include: a plurality of oval embossments that protrude therefrom, wherein the plurality of embossments include first embossments each having a longer axis oriented in a first direction and second embossments each having a longer axis oriented in a second direction, bridges provided on portions of the flat plate, between the first embossments and the second embossments, and flat portions provided on the flat plate are surrounded by the first embossments and the second embossments and bridges to separate the flat portions from each other. In particular, the first direction may intersect the second direction at a predetermined angle.

According to exemplary embodiments of the present disclosure, each of the first embossments may have a height that continuously changes in a direction of the longer axis. Additionally, each of the first embossments may have a height that continuously changes in a direction of the shorter axis. Specifically, each of the first embossments may include: a first central portion convex-shaped to have a first curvature; a first peripheral portion concave-shaped to have a second curvature greater than the first curvature; and a first side portion provided between the first central portion and the first peripheral portion and convex-shaped to have a third curvature greater than the first curvature.

In addition, according to exemplary embodiments of the present disclosure, each of the second embossments may have a height that continuously changes in the direction of the longer axis. Each of the second embossments may have height that continuously changes in the direction of the shorter axis. Specifically, each of the second embossments may include: a second central portion convex-shaped to have a fourth curvature; a second peripheral portion concave-shaped to have a fifth curvature greater than the first curvature; and a second side portion provided between the second central portion and the second peripheral portion and convex-shaped to have a sixth curvature greater than the fourth curvature.

According to exemplary embodiments of the present disclosure, each of the bridges may be connected integrally to the first side portion of a corresponding one of the first embossments and the second side portion of a corresponding one of the second embossments. The height of the bridges may be less than a maximum height of embossments having a lower height of the first embossments and the second embossments. Specifically, the height of the bridges may be about 0.5 to 0.8 times the maximum height of embossments having a lower height of the first embossments and the second embossments. In addition, each of the bridges may be disposed in a location in which the distance between the corresponding first embossment and the corresponding second embossment is smallest. The first embossments and the second embossments may be formed by a process of imprinting oval embossments on the flat plate.

In the high-strength metal plate for vehicles according to exemplary embodiments of the present disclosure, the flat portions of the flat plate may be separated from each other by the embossments and the bridges instead of being continuously connected, and thus, the strength and resonance frequency of the plate may be significantly improved compared to those of related-art plates. Accordingly, due to improved strength, the thickness of the plate may be reduced while maintaining the performance of the plate at a level equal to those of existing plates. In addition, the reduced thickness allows the weight and the amount of the material of the plate to be reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described with reference to the accompanying drawings.

In the accompanying drawings, FIGS. 1 to 6 illustrate a high-strength plate according to an exemplary embodiment of the present disclosure. As illustrated in FIGS. 1 to 6, the high-strength plate according to the present disclosure may be a flat plate 100 having a plurality of oval embossments 110 and 120 that protrude therefrom.

The flat plate 100 may be produced by converting a metal material, such as a steel plate or an aluminum material, into a flat shape having a predetermined thickness. The plurality of oval embossments 110 and 120 may be arranged in a horizontal direction and a vertical direction of the flat plate 100, and may be categorized into the first embossments 110 and the second embossments 120 based on the orientation of a longer axis. Among the plurality of oval embossments 110 and 120, the embossments with the longer axes oriented in a first direction are first embossments 110, while the embossments with the longer axes oriented in a second direction are the second embossments 120.

Figure 1:
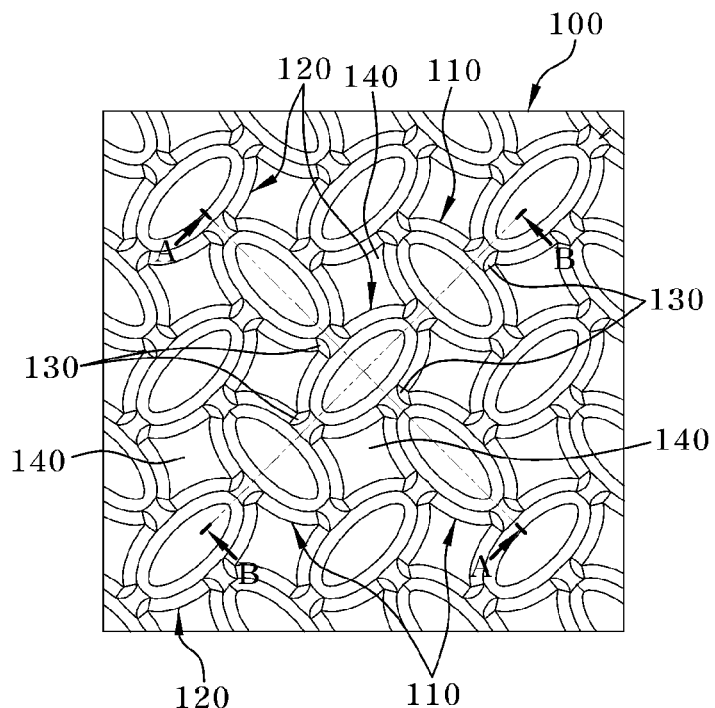
FIG. 1 is a plan view illustrating a high-strength metal plate according to an exemplary embodiment of the present disclosure.

The first direction and the second direction may be set to intersect each other at a predetermined angle. For example, the first direction may be set to intersect the second direction at an angle of from about 60° to 120°. As illustrated in FIG. 1, the first direction may be set to intersect the second direction at about 90°. In other words, the longer axes of the first embossments 110 may be inclined with respect to the longer axes of the second embossments 120 at a predetermined angle. In the same manner, the longer axes of the second embossments 120 may be inclined with respect to the longer axes of the first embossments 110 at a predetermined angle. The first embossments 110 provided on the flat plate 100 may be spaced apart from each other by predetermined distances. In addition, the second embossments 120 provided on the flat plate 100 may be spaced apart from each other by predetermined distances.

Figure 2:
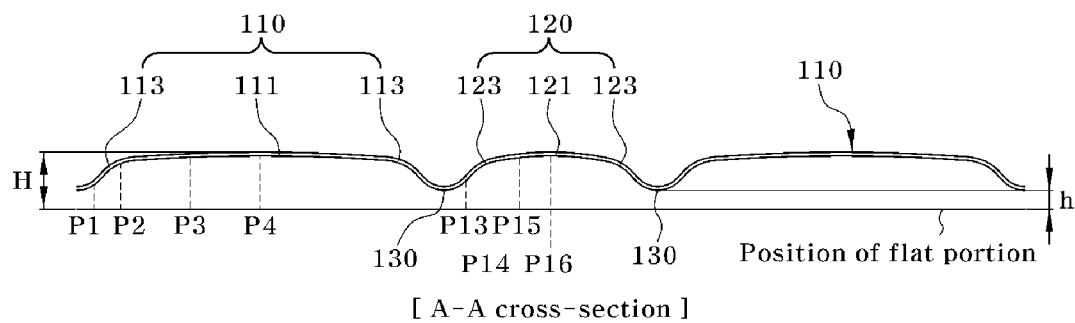
FIG. 2 is a cross-sectional view taken along line A-A in FIG. 1 according to an exemplary embodiment of the present disclosure.
Figure 3:
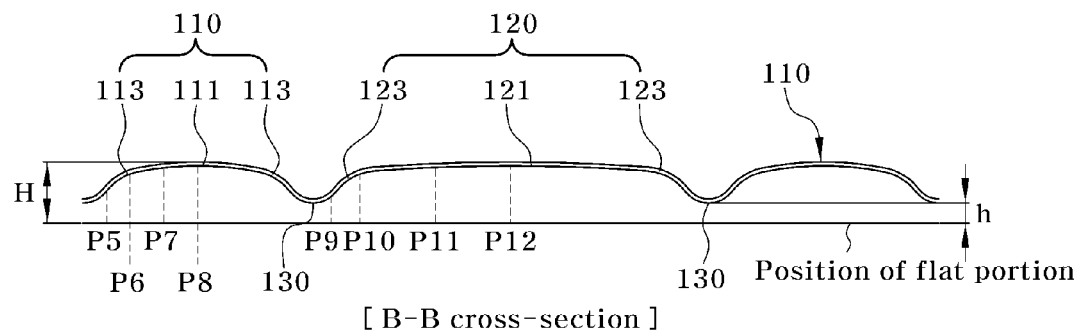
FIG. 3 is a cross-sectional view taken along line B-B in FIG. 1 according to an exemplary embodiment of the present disclosure.

As illustrated in FIGS. 2 and 3, each of the first embossments 110 may have a height that continuously changes in a longer axis direction, i.e. a direction of the longer axis, of the first embossment 110. In addition, the first embossment 110 may have a height that continuously changes in a shorter axis direction, i.e. a direction of the shorter axis, of the first embossment 110. Since the height of the first embossment 110 may change continuously in the longer axis direction, the height of the first embossment 110 may change based on the position in the longer axis direction. In addition, since the height of respective first embossments 110 may change continuously in the shorter axis direction, the height of the first embossment 110 may change on the position in the shorter axis direction.

As illustrated in FIG. 2, the first embossment 110 may have different values of height at points indicated as P1, P2, P3, and P4. In addition, as illustrated in FIG. 3, the first embossment 110 may have different values of height at points indicated as P5, P6, P7, and P8. The first embossment 110 as described above may have a curvature that ranges from D20 to 200 in the longer axis direction and the shorter axis direction. In addition, the first embossment 110 may have a length of the longer axis that ranges from about 20 mm to 200 mm.

Figure 4A:
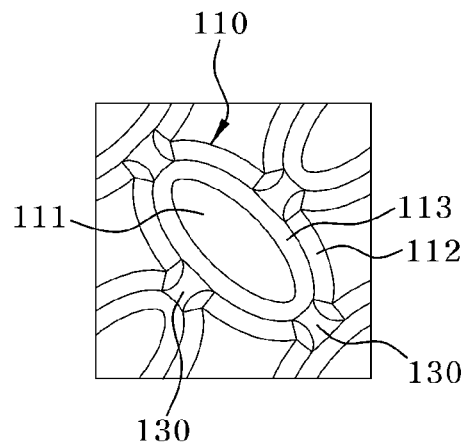
FIG. 4A is a partially enlarged view of FIG. 1 according to an exemplary embodiment of the present disclosure.

As illustrated in FIG. 4A, the first embossment 110 may include a first central portion 111, a first peripheral portion 112, and a first side portion 113. The first central portion 111 may be disposed on the uppermost portion of the first embossment 110. The first central portion 111 may be convex-shaped to have a first curvature in the longer axis direction. In addition, the first central portion 111 may be convex-shaped to have the first curvature also in the shorter axis direction.

The first peripheral portion 112 may be disposed on the lowermost portion of the first embossment 110. The first peripheral portion 112 may be concave-shaped to have a second curvature in the longer axis direction. The value of the second curvature may be set to be greater than the value of the first curvature. Additionally, the first peripheral portion 112 may be concave-shaped to have the second curvature also in the shorter axis direction. The first side portion 113 may be formed integrally with the first central portion 111 and the first peripheral portion 112 to be disposed between the first central portion 111 and the first peripheral portion 112. The first side portion 113 may be convex-shaped to have a third curvature in the longer axis direction. The value of the third curvature may be set to be greater than the value of the first curvature. The first side portion 113 may be convex-shaped to have the third curvature in the shorter axis direction. The first embossment 110 configured as described above may have three different curvatures in the longer axis direction and three different curvatures in the shorter axis direction. In other words, the first embossment 110 may have different curvatures according to areas predetermined in the longer axis direction and the shorter axis direction.

Referring to FIG. 2, the first embossment 110 may have a maximum height at the point P4 located at the center of the first central portion 111. The point P8 illustrated in FIG. 3 may be at the same position as the point P4. In addition, the second embossment 120 may have a height that continuously changes in a longer axis direction. The second embossment 120 may have a height that continuously changes in a shorter axis direction.

With the height of each of the second embossments 120 continuously changing in the longer axis direction, the height of the second embossment 120 may change based on the position in the longer axis direction. In addition, since the height of second embossment 120 continuously changes in the shorter axis direction, the height of the second embossments 120 may change based on the position in the shorter axis direction.

As illustrated in FIG. 3, the second embossment 120 may have different values of height at points indicated as P9, P10, P11, and P12. As illustrated in FIG. 2, the second embossment 120 may have different values of height at points indicated as P13, P14, P15, and P16. The second embossment 120 as described above may have a curvature thereof ranges from D20 to 200 in the longer axis direction and the shorter axis direction. In addition, the second embossment 120 may have a length of the longer axis that ranges from about 20 mm to 200 mm.

Figure 4B:
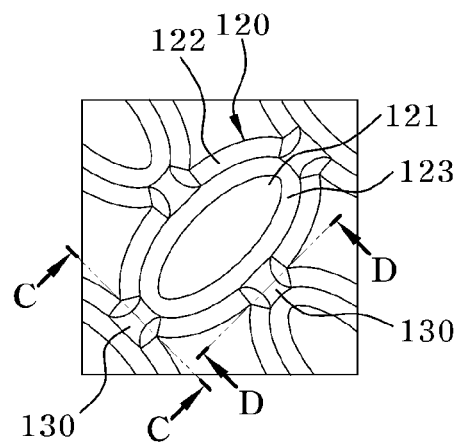
FIG. 4B is a partially enlarged view of FIG. 1 according to an exemplary embodiment of the present disclosure.
Figure 5:
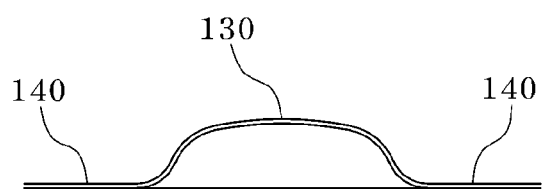
FIG. 5 is a cross-sectional view taken along line C-C in FIG. 4B according to an exemplary embodiment of the present disclosure.
Figure 6:
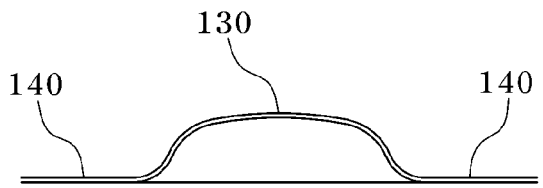
FIG. 6 is a cross-sectional view taken along line D-D in FIG. 4B according to an exemplary embodiment of the present disclosure.

As illustrated in FIG. 4B, the second embossment 120 may include a second central portion 121, a second peripheral portion 122, and a second side portion 123. The second central portion 121 may be disposed on the uppermost portion of the second embossment 120. The second central portion 121 may be convex-shaped to have a fourth curvature in the longer axis direction. In addition, the second central portion 121 may be convex-shaped to have the fourth curvature also in the shorter axis direction. The curvature of the second central portion 121 may be the same as the curvature (i.e. the first curvature) of the first central portion 111. In other words, the fourth curvature may be the same as the first curvature.

Further, the second peripheral portion 122 may be disposed on the lowermost portion of the second embossment 120. The second peripheral portion 122 may be concave-shaped to have a second curvature in the longer axis direction. The value of the fifth curvature may be set to be greater than the value of the fourth curvature. The second peripheral portion 122 may be concave-shaped to have the fifth curvature also in the shorter axis direction. In addition, the curvature of the second peripheral portion 122 may be the same as the curvature (i.e. the second curvature) of the first peripheral portion 112. In other words, the fifth curvature may be the same as the second curvature.

The second side portion 123 may be formed integrally with the second central portion 121 and the second peripheral portion 122 to be disposed between the second central portion 121 and the second peripheral portion 122. In addition, the second side portion 123 may be convex-shaped to have a sixth curvature in the longer axis direction. The value of the sixth curvature may be set to be greater than the value of the fourth curvature. The second side portion 123 may be convex-shaped to have the sixth curvature in the shorter axis direction.

In addition, the curvature of the second side portion 123 may be the same as the curvature (i.e. the second curvature) of the first side portion 113. In other words, the sixth curvature may be the same as the third curvature. The second embossment 120 configured as described above may have three different curvatures in the longer axis direction and three different curvatures in the shorter axis direction. In other words, the second embossment 120 may have different curvatures according to areas predetermined in the longer axis direction and the shorter axis direction.

Referring to FIG. 3, the second embossment 120 may have a maximum height at the point P12 located at the center of the second central portion 121. The point P16 illustrated in FIG. 2 may be at the same position as the point P12. In addition, referring to FIGS. 1 to 6, the flat plate 100 may include bridges 130 that connect the first embossments 110 and the corresponding second embossments 120, respectively. Each of the bridges 130 may be convex-shaped to have a predetermined curvature.

Figure 7:
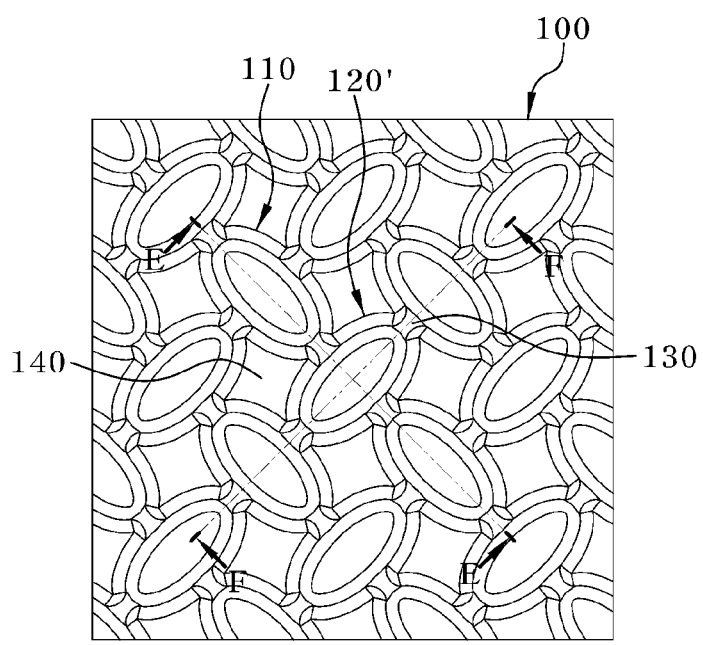
FIG. 7 is a plan view illustrating a high-strength metal plate according to another exemplar)/embodiment of the present disclosure.
Figure 8:
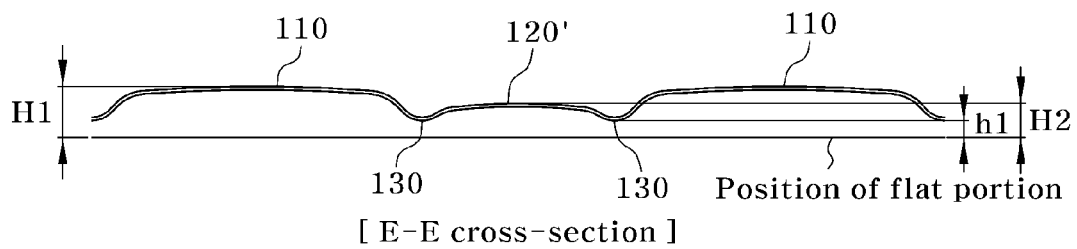
FIG. 8 is a cross-sectional view taken along line E-E in FIG. 7 according to another exemplary embodiment of the present disclosure.
Figure 9:
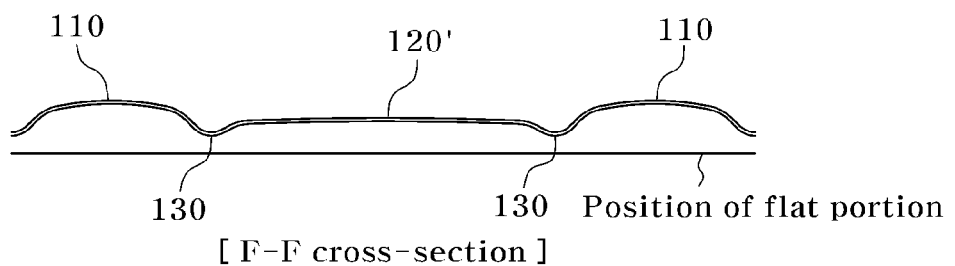
FIG. 9 is a cross-sectional view taken along line F-F in FIG. 7 according to another exemplar)/embodiment of the present disclosure.

In particular, the bridge 130 may be connected integrally to the first side portion 113 of the first embossment 110 and the second side portion 123 of the second embossment 120, and may have a height h that is less than the maximum height H of the first embossment 110 (see FIG. 2). When the first embossment 110 and a second embossment 120' have different maximum heights H1 and H2 as illustrated in FIGS. 7 to 9, the bridge 130 may have a height h1 that is less than the lower one of the maximum heights. The maximum height of the first embossment 110 may be determined to be the same as or different from the maximum height of the second embossment 120 or 120'. For example, the maximum height of the first embossment 110 may be greater or less than the maximum height of the second embossment 120 or 120'.

Neither the first peripheral portion 112 nor the second peripheral portion 122 is provided in the area in which the bridge 130 is formed. Since the bridges 130 may be disposed between the first embossments 110 and the second embossments 120, respectively, the flat plate 100 may be provided with flat areas (i.e. flat portions) surrounded by the first embossments 110, the second embossments 120, and the bridges 130. Each of flat portions 140 formed on the flat plate 100 is an area in which none of the oval embossments 110 and 120 and the bridges 130 are formed. As illustrated in FIGS. 1 and 7, the flat portions 140 may be separated from each other, isolated by the first embossments 110, the second embossments 120, and the bridges 130. In other words, the flat portions 140 may be isolated by the first embossments 110, the second embossments 120, and the bridges 130, and therefore, each of the flat portions 140 may not be connected to any of the remaining flat portions 140 (e.g., may be separated therefrom).

Since the flat portions 140, i.e. the flat areas disposed between the oval embossments 110 and 120, may be separated from each other in an isolated manner, instead of being continuously connected to each other, the high-strength plate according to the present disclosure may have effects that the strength and resonance frequency thereof are significantly improved compared to those of existing plates. As described above, the height of the bridge 130 may be determined to be less than the maximum height of the embossment having a lower height (hereinafter, referred to as the lower embossment) of the first embossment 110 and the second embossment 120 or 120'.

Specifically, the bridge 130 may have a height less than about 50% to 80% of the maximum height of the lower embossment. In other words, the height of the bridge 130 may be equal to or less than about 0.5 to 0.8 times the maximum height of the lower embossment. The height of the bridge 130 may be about 0.5 to 0.8 times the maximum height of the lower embossment. The height of the bridge 130 may be limited to the maximum height of the lower embossment to improve the formability as well as the durability and vibration performance of the high-strength plate. In addition, when the bridge 130 is formed between the first embossment 110 and the second embossment 120, the bridge 130 may be formed in a location in which the distance between the first embossment 110 and the second embossment 120 is shortest.

Particularly, the heights of the first embossment 110 and the second embossments 120 and 120' may be determined based on the flat portions 140. In addition, the first embossment 110 and the second embossment 120 may be formed by a process of imprinting the oval embossments on the flat plate 100. For example, the first embossment 110 and the second embossment 120 may be formed by a drawing process or an embossing process. In particular, the first embossment 110 and the second embossment 120 may be formed on the flat plate 100 to protrude to be convex in the same direction.

Since the first embossment 110 and the second embossment 120 may be formed by the process of imprinting the embossments, the first embossment 110 and the second embossment 120 may be formed by straining (or drawing) predetermined areas of the flat plate 100. Thus, during the shaping process, the thicknesses of the first embossment 110 and the second embossment 120 may be respectively reduced to be thinner than the thickness of the flat plate 100. Accordingly, the thicknesses of the first embossment 110 and the second embossment 120 may be set in consideration that the respective thicknesses of the oval embossments 110 and 120 are changed to be thinner than thickness of the flat plate 100 during the shaping process. During the shaping of the oval embossments 110 and 120, such a thickness decrease generally occurs in the central portions 111 and 121 and the side portions 113 and 123.

Specifically, each of the first embossment 110 and the second embossment 120 may be shaped with a thickness thereof about 70% or more of the thickness of the flat plate 100. In addition, when the oval embossments 110 and 120 are processed on the flat plate 100, the maximum height of each of the oval embossments 110 and 120 may be set such that the thickness reduction rate of the flat plate 100 serving as a base material is about 30% or less.

Figure 10:
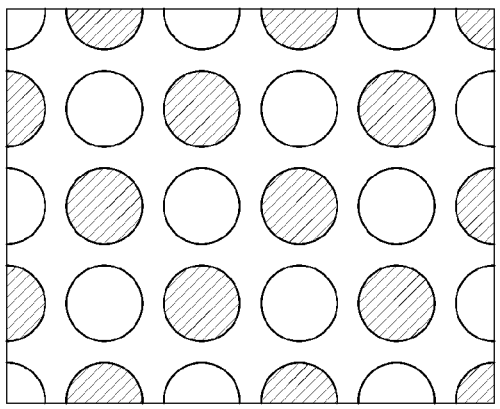
FIG. 10 is a plan view illustrating a plate for a vehicle of the related art.

In the high-strength plate according to the present disclosure may have effects that the strength and resonance frequency thereof may be significantly improved compared to those of existing plates, since the flat portions 140 of the flat plate 100 may be separated from each other by the oval embossments 110 and 120 and the bridges 130, instead of being continuously connected to each other, the high-strength plate according to the present disclosure. In plates of the related art, flat areas without embossment structures are continuously connected to each other (see FIG. 10), such that vibrations may be caused and strength may be reduced.

Since the high-strength plate according to the present disclosure has improved strength, it may be possible to reduce the thickness of the plate while maintain the performance of the plate. Due to the reduced thickness, it may be possible to reduce the weight and the amount of the material of the plate. The high-strength plate may be used for panels of a vehicle body, a muffler housing, a heat protector, and the like to reduce the weight of a vehicle and improve the fuel efficiency of the vehicle. For example, the high-strength plate may be used in the entire portions of the panels of the vehicle body or locally in portions of the panels having a lower level of strength, thereby improving the strength and unique number of vibrations of a vehicle body. For example, the high-strength plate used for a muffler housing may reduce the weight of the muffler housing while maintaining the strength of the muffler at a level equal to those of existing muffler housings.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A high-strength metal plate for vehicles, the plate being a flat plate, the plate comprising:
   a plurality of oval embossments that protrude from the plate, wherein the plurality of embossments include first embossments each having a longer axis oriented in a first direction and second embossments each having a longer axis oriented in a second direction;
   a plurality of bridges provided on portions of the flat plate, between the first embossments and the second embossments; and
   a plurality of flat portions provided on the flat plate and surrounded by the first embossments and the second embossments and bridges to separate the flat portions from each other.

2. The plate according to claim 1, wherein the first direction intersects the second direction at a predetermined angle.

3. The plate according to claim 1, wherein each of the first embossments has a height that continuously changes in a direction of the longer axis.

4. The plate according to claim 3, wherein each of the first embossments has a height that continuously changes in a direction of the shorter axis.

5. The plate according to claim 4, wherein each of the first embossments includes:
   a first central portion convex-shaped to have a first curvature;
   a first peripheral portion concave-shaped to have a second curvature greater than the first curvature; and
   a first side portion provided between the first central portion and the first peripheral portion and convex-shaped to have a third curvature greater than the first curvature.

6. The plate according to claim 4, wherein each of the second embossments has a height that continuously changes in the direction of the longer axis.

7. The plate according to claim 6, wherein each of the second embossments has a height that continuously changes in the direction of the shorter axis.

8. The plate according to claim 7, wherein each of the second embossments includes:
- a second central portion convex-shaped to have a fourth curvature;
- a second peripheral portion concave-shaped to have a fifth curvature greater than the first curvature; and
- a second side portion provided between the second central portion and the second peripheral portion and convex-shaped to have a sixth curvature greater than the fourth curvature.

9. The plate according to claim 8, wherein each of the plurality of the bridges is connected integrally to the first side portion of a corresponding one of the first embossments and the second side portion of a corresponding one of the second embossments, wherein a height of the bridges is less than a maximum height of embossments having a lower height of the first embossments and the second embossments.

10. The plate according to claim 9, wherein the height of the bridges is about 0.5 to 0.8 times the maximum height of embossments having a lower height of the first embossments and the second embossments.

11. The plate according to claim 9, wherein each of the bridges is provided in a location in which the distance between the corresponding first embossment and the corresponding second embossment is smallest.

12. The plate according to claim 9, wherein the first embossments and the second embossments protrude in a convex shape in a single direction.

13. The plate according to claim 1, wherein the first embossments and the second embossments are formed by a process of imprinting oval embossments on the flat plate.

* * * * *